April 19, 1949. T. B. ALLARDICE 2,467,452
LIQUID GAUGE GLASS FOR HIGH-PRESSURE SERVICE
Filed Feb. 1, 1947 2 Sheets-Sheet 1
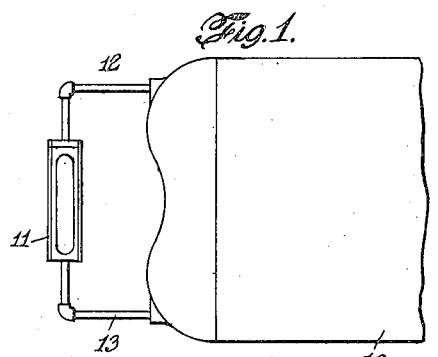
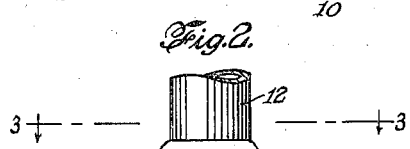
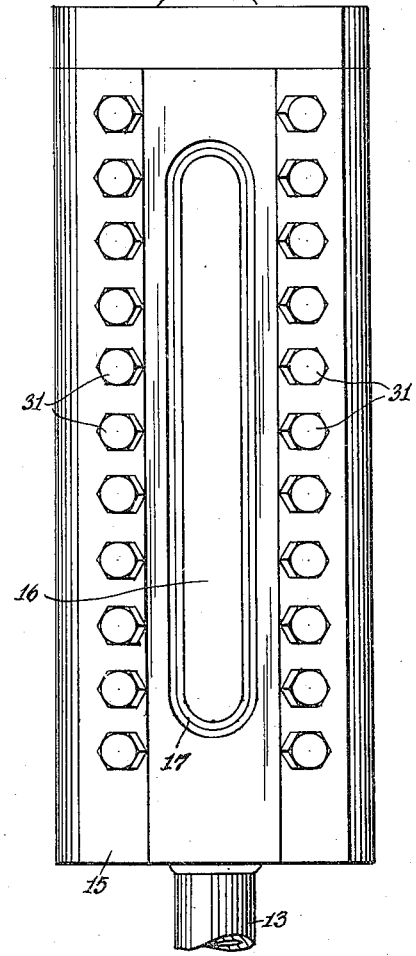
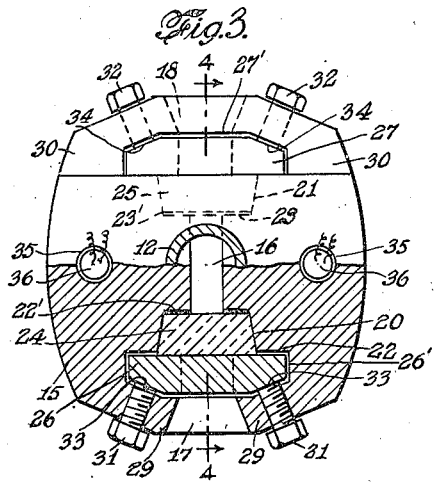
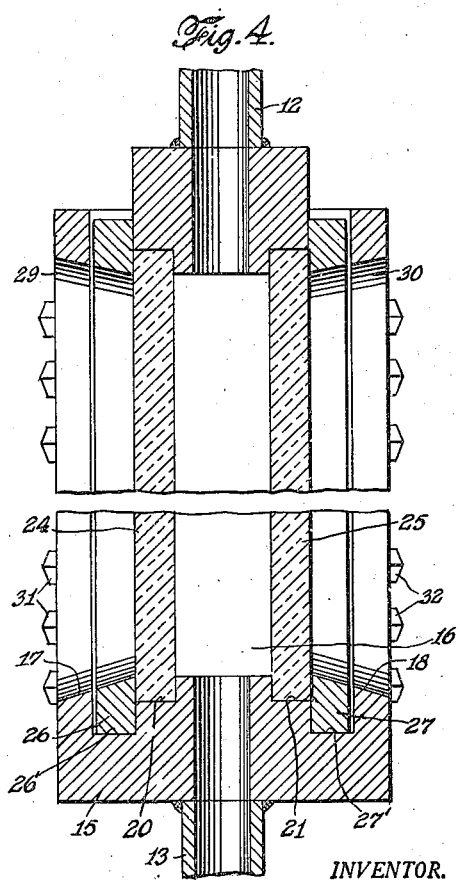
INVENTOR.
THOMAS B. ALLARDICE
BY
ATTORNEY April 19, 1949.  T. B. ALLARDICE  2,467,452
LIQUID GAUGE GLASS FOR HIGH-PRESSURE SERVICE
Filed Feb. 1, 1947  2 Sheets-Sheet 2
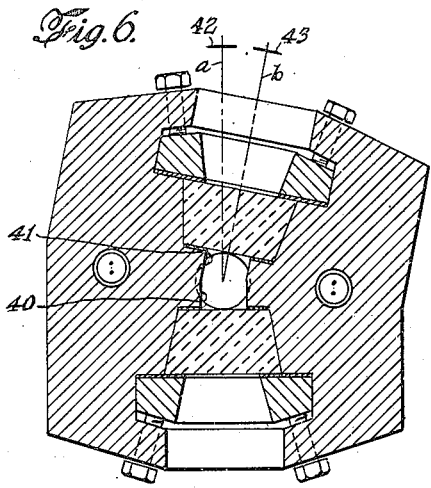
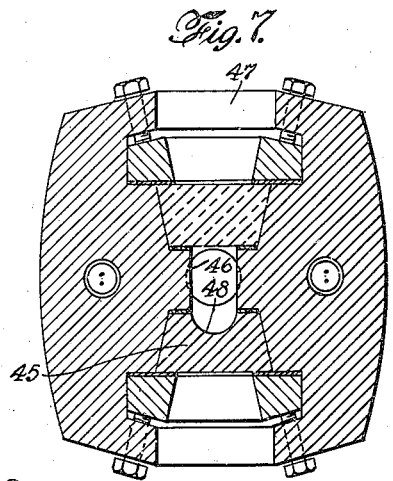
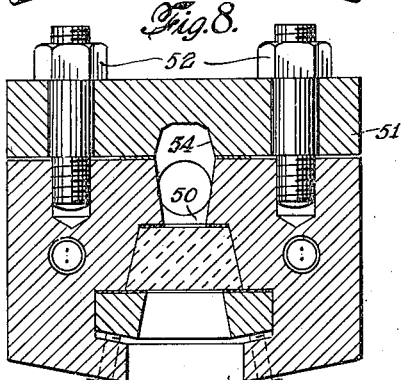
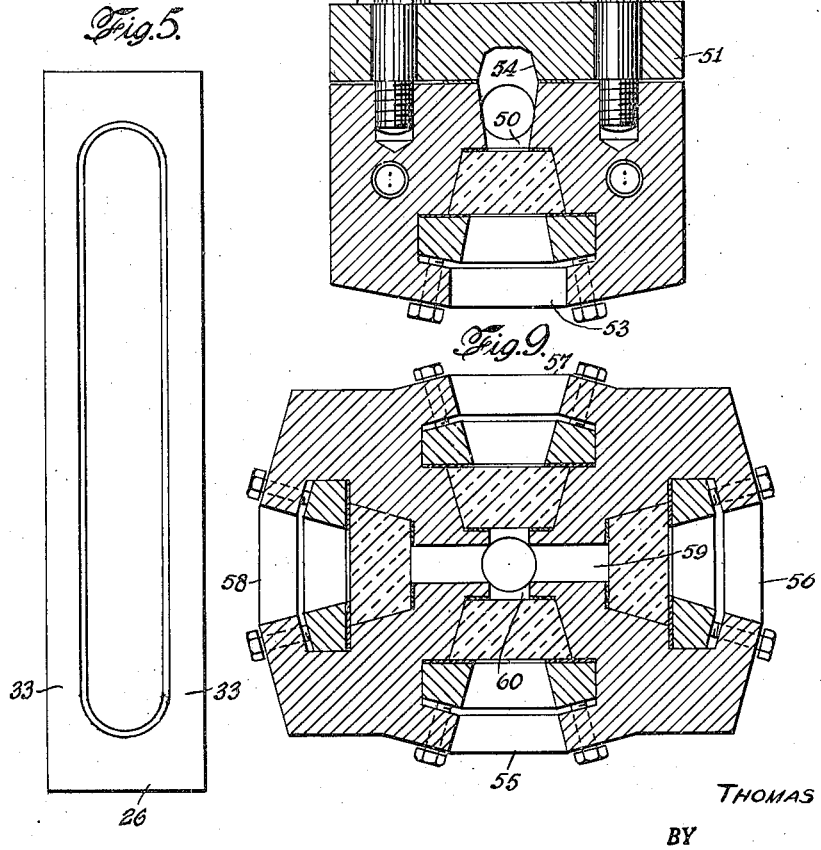
INVENTOR.
THOMAS B. ALLARDICE
BY
ATTORNEY Patented Apr. 19, 1949

2,467,452

UNITED STATES PATENT OFFICE 2,467,452

LIQUID GAUGE GLASS FOR HIGH-PRESSURE SERVICE

Thomas B. Allardice, Mountain Lakes, N. J.

Application February 1, 1947, Serial No. 725,881

3 Claims. (Cl. 73—330)

1

The invention relates to liquid gauge glasses used in connection with boilers for generating steam, and more particularly to gauges of this nature suitable for high-pressure service.

The invention has for an object to provide a simple construction of gauge glass of the aforesaid nature; also a gauge glass having materially greater strength and longer life than those now in general use.

Another object of the invention is to provide a construction of gauge glass which will admit of convenient and rapid replacement of a transparent sealing block or section thereof should this become necessary.

A further object of the invention is to provide a novel transparent sealing block or section whereby to reduce substantially the effective area subjected to the liquid and steam pressure.

Still another object of the invention is to provide for a two-color indication in connection with the level of the water within the gauge glass.

In carrying out the invention, there is provided in a block of suitable material a vertically extending transverse opening which is located intermediate its ends and has communication with suitable boiler connections extending externally of the block for including the gauge in a boiler system, as is well understood. There communicates further with this opening a recessed portion located adjacently thereto and affording pairs of sealing faces located respectively on opposite sides of said opening. A transparent section is adapted to fit this recessed portion to seal the transverse opening at the said sealing faces when pressure is applied to the section.

This is effected, in accordance with the invention, by providing a holding socket adjacent the recessed portion, which socket extends through one end of the block to receive a longitudinally slotted locking block, the slot thereof registering with the transparent sealing section so as to afford a view of liquid in the transverse opening. The socket for the locking block is formed in part by a pair of outer arm portions oppositely directed thereover and providing a window between the free ends of said arms aligned with the locking block and the sealing section. Tap bolts threaded through the arms contact respective surfaces of the locking block to force the same under substantial pressure against the sealing section which, in turn, becomes sealed thereby against the sealing faces upon opposite sides of the gauge opening to adequately seal the same thereat.

A similar sealing may be provided at the dia-

2 metrically opposite part of the transverse opening or a simple bolted closure member with inner reflecting surface juxtaposed to the opening may be provided.

The nature of the invention, however, will best be understood when described in connection with the accompanying drawings, in which:

Fig. 1 is a fragmentary elevation of the drum of a boiler showing the novel gauge glass connected thereto.

Fig. 2 is a front elevation of the novel gauge glass on an enlarged scale.

Fig. 3 is a transverse section taken on the line 3—3, Fig. 2, looking in the direction of the arrows, with further portion of the gauge glass indicated in horizontal section.

Fig. 4 is a vertical section taken on the line 4—4, Fig. 3 of the drawings, and looking in the direction of the arrows.

Fig. 5 is a front elevation of the locking block.

Fig. 6 is a horizontal section illustrating a modification in the form of gauge glass indicated in Figs. 1-4.

Figs. 7 and 8 are horizontal sections illustrating further modifications; and Fig. 9 is a horizontal section illustrating a multiple-indication type of gauge glass.

Referring to the drawings, 10 designates a boiler drum to which the novel gauge glass 11 is connected in the usual manner through the connections 12 and 13. As indicated more particularly in Figs. 2-5, inclusive, this glass comprises essentially a body member or steel block 15 having a vertically extending and, preferably, centrally located opening 16 provided therein. The said opening is designed for registry with several further openings or recesses provided in the block which are aligned therewith so as to permit, in the particular embodiment indicated, viewing the interior of the opening 16 through the diametrically opposed sight openings 17 and 18. Between these sight openings and the opening 16, which latter is symmetrically arranged upon opposite sides of the longitudinal axis of the block, there are provided the recesses 20 and 21 immediately adjacent the opening 16 and each of which affords faces 22 and 23, respectively, upon opposite sides of the said opening. These recesses are designed to receive from the front respective sealing sections 24 and 25 of glass and shaped to fit the corresponding recesses with intermediate gaskets 22', 23', respectively, against the faces 22, 23, whereby to effect a complete seal thereat for the liquid within opening 16.

It is preferred to make the recesses 20 and 21, as well as the corresponding sealing section fitting therein, of trapezoidal shape in cross-section, as indicated, and to reduce thereby substantially the effective pressure area against which the internal pressure would act to force out such blocks.

To prevent such displacing action of the internal pressure, provision is made to enclose in part the outer surface portion of the longitudinally slotted locking blocks 26 and 27 placed within adjacent recesses or sockets 26' and 27' open at their tops. These recesses are formed more especially in the provision of respective pairs of integral arm portions 29 and 30 of the block 15, said arms leaving between them the sight openings 17 and 18, respectively, to thus afford a clear view to the interior of the opening 16 therethrough and through the locking block openings.

In accordance with the invention, there is threaded through the said arm portions a plurality of longitudinally disposed tap screws 31 and 32 which are caused to bear upon shoulders 33 and 34 respectively of the locking blocks. By this expedient, the required pressure to seal in positively the transparent sections 24 and 25 may readily be obtained, and such pressure will be continuously maintained throughout operation of the glass.

In order to prevent undue thermal expansion effects and resultant stresses, provision is made for maintaining the unit or block at a substantially predetermined temperature. Thus, vertical sockets 35 extend downwardly from the top of the unit upon opposite sides of opening 16, and the same are adapted to receive suitable electrical heating elements 36, such as the well-known "Calrod" elements. By this expedient the breakage of the transparent sections is greatly reduced, resulting in material saving in maintenance charges as well as enhancing the safety factor.

While in the previously described embodiment the two portions of the opening 16 are shown as lying in the same transverse axis, this arrangement is not essential; and in some instances it is desirable to have the respective portions upon opposite sides of the longitudinal axis at a slight angle to each other. For example, as indicated in Fig. 6 of the drawings, the portion 40 is indicated at a suitable angle to the portion 41; and in accordance with a multicolor indication arrangement, there is located in the axis $a$ of the former opening portion a colored reflector member 42, while in the axis $b$ of the other opening 41 is located a reflector member 43 of a different color from that of the reflector 42, both reflectors being located externally of the gauge glass. By this expedient, the indication of the water will be of one color and that of the steam of a different color, due to their different refractive indices, as viewed.

It is not necessary, also, that indications be afforded at both sides of the unit block. For example, as indicated in Fig. 7, the sealing section 45 for the one side of the transverse opening 46 may be opaque so that the indications may be observed only through the sight opening 47, a reflector surface 48 being provided on the adjacent inner surface of the block 45. Or, as indicated in Fig. 8, substantially the one half of the block utilized in the foregoing embodiments may be eliminated and the rear portion of opening 50 may be sealed by an opaque longitudinal plate member 51 bolted thereto by the bolts 52. In this instance, the indications are visible through the sight opening 53 through reflection from the inner surface 54 juxtaposed to said opening 50.

Of course, if desired, the number of indicating or sight apertures may be multiplied, for example and as indicated in Fig. 9, to the extent of four sight openings 55, 56, 57 and 58. In such case, a transverse opening 59 is provided additional to the opening 60 and at right angles thereto. Provision is made also for corresponding sealing sections and locking blocks with pressure tap screws, as in the hereinbefore described embodiments.

I claim:

1. A liquid gauge glass for high-pressure service, comprising a block having a vertically extended transverse opening intermediate its ends, end connections thereto extending externally of the block, a communicating and recessed portion adjacent the opening affording sealing faces upon opposite sides thereof, a transparent section adapted to fit the recessed portion and to seal said transverse opening at said sealing faces, there being a holding socket adjacent the recessed portion and extending through one end of the block, said block affording a pair of arm portions oppositely directed over the holding socket and providing a window between their ends, and a slotted locking block insertable through the open end of and loosely fitted to the holding socket and provided with respective surfaces exposed to said arms, the slot of said block registering with said window and transparent section, together with tap bolts threaded through the arm portions adapted to bear respectively against said exposed surfaces for forcing the locking block against said transparent section to seal the transverse opening at said sealing faces.

2. A liquid gauge glass for high-pressure service according to claim 1, wherein the transverse opening extends entirely through the block, and similar sealing means are provided therefor.

3. A liquid gauge glass for high-pressure service according to claim 1, wherein the transverse opening extends entirely through the block, and an opaque locking member is provided over said opening at one face thereof and has a reflective surface portion juxtaposed to the corresponding one face of the transverse opening.

THOMAS B. ALLARDICE.

REFERENCES CITED

The following references are of record in the file of this patent:

UNITED STATES PATENTS

| Number | Name | Date |
|---|---|---|
| 470,858 | Klinger | Mar. 15, 1892 |
| 1,141,381 | Cunliff | June 1, 1915 |
| 2,024,815 | Blackburn | Dec. 17, 1935 |
| 2,043,753 | Jerguson | June 9, 1936 |

FOREIGN PATENTS

| Number | Country | Date |
|---|---|---|
| 156,446 | Great Britain | Jan. 13, 1921 |
| 599,792 | Germany | July 3, 1932 |